United States Patent [19]

Bukhtiyarov et al.

[11] 4,202,206

[45] May 13, 1980

[54] DEVICE FOR MEASURING POWER OUTPUT OF AN INTERNAL-COMBUSTION ENGINE

[75] Inventors: Ivan D. Bukhtiyarov; Viktor B. An; Alexei S. Demin, all of Novosibirskaya; Marat N. Farshatov, Tolyatti Kuibyshevskoi; Valery A. Slepchuk, Novosibirsk, all of U.S.S.R.

[73] Assignee: Spetsialnoe Opytnoe Proektno-Konstruktorsko-Tekh-nologicheskoe Bjuro Sibirskogo Otdelenia Vsesojuznoi Akademii Selskokhozyaistvennykh Nauk Imeni v.i. Lenina, Novosibirskaya, U.S.S.R.

[21] Appl. No.: 949,097

[22] Filed: Oct. 6, 1978

[51] Int. Cl.² ............................................. G01M 15/00
[52] U.S. Cl. ............................................................ 73/116
[58] Field of Search ............................ 73/116, 117.3, 118

[56] References Cited

U.S. PATENT DOCUMENTS 4,061,026   12/1977   Goodfriend et al. ................. 73/116
4,081,995   4/1978   Griffith et al. ......................... 73/116

Primary Examiner—Jerry W. Myracle
Attorney, Agent, or Firm—Fleit & Jacobson

[57] ABSTRACT

A device for measuring the power output of an internal-combustion engine comprises a serial arrangement including a pickup for taking up the speed of rotation of the shaft of the internal-combustion engine, a pulse former, a selector for selecting the speed of rotation of the shaft of the internal-combustion engine, a unit for controlling the device, a unit for producing a train of electric pulses, a unit for determining the difference of two adjacent pulse trains, and a unit for recording the measurement results. Connected to the engine shaft speed selector are an engine duty control unit and a clock pulse generator. The pulse train producing unit is connected to the pulse former to which a unit for producing a preset number of pulses is connected. The device control unit and the unit for producing a preset number of pulses are connected to the unit for determining the difference of two adjacent pulse trains and to the clock pulse generator.

8 Claims, 25 Drawing Figures

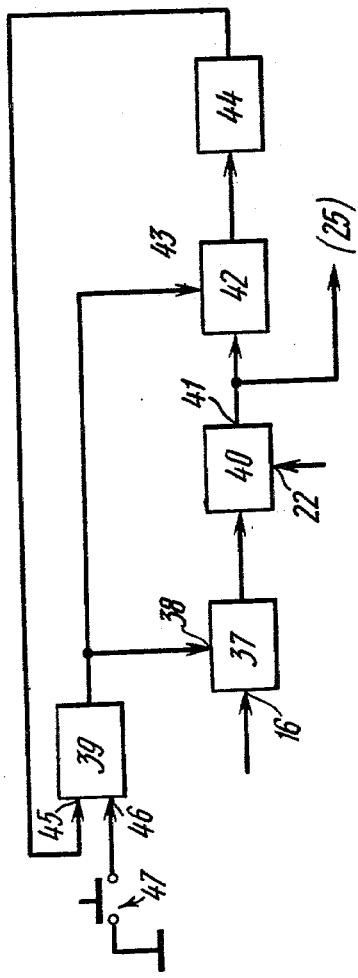
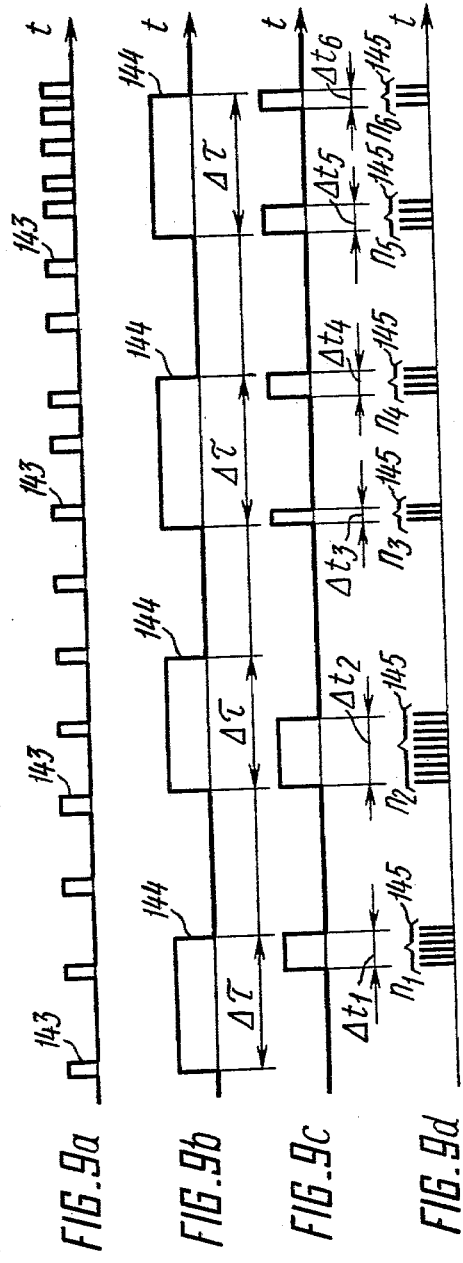
FIG. 7
FIG. 9a
FIG. 9b
FIG. 9c
FIG. 9d

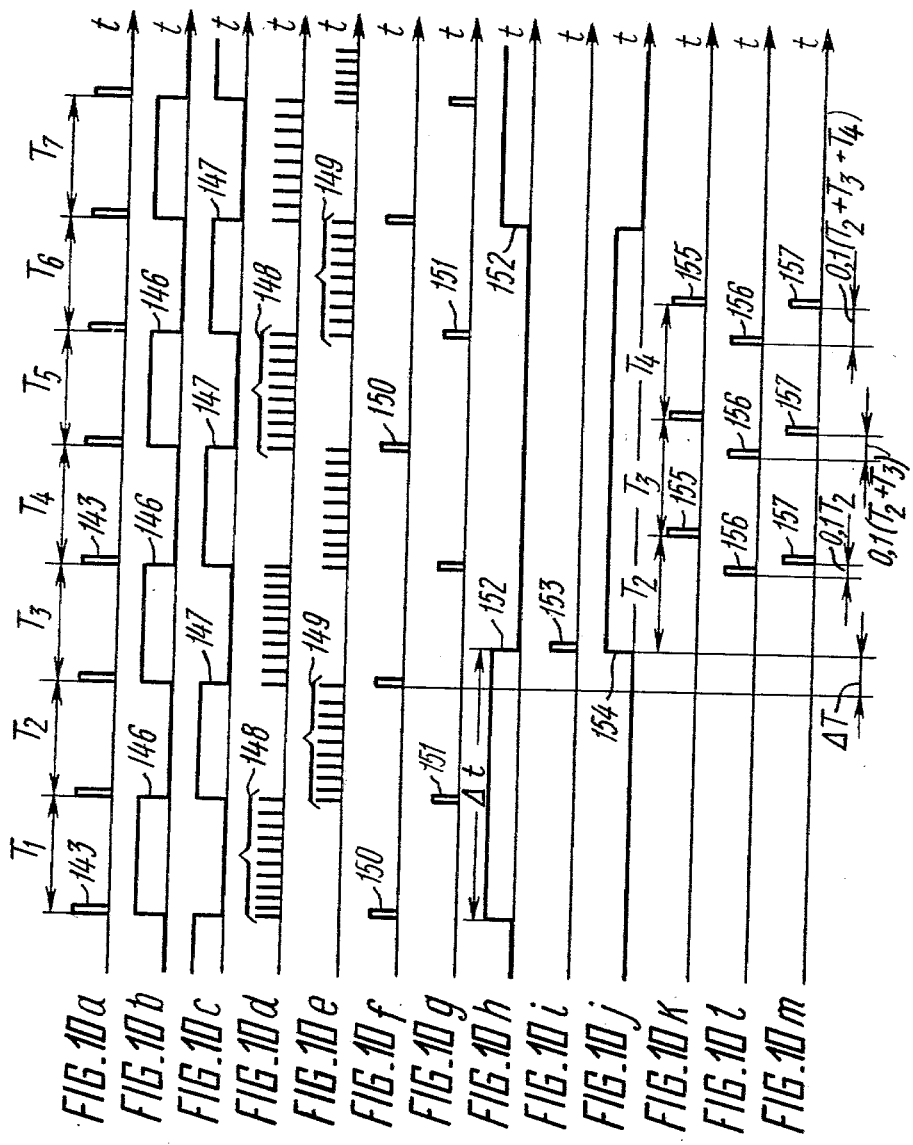

DEVICE FOR MEASURING POWER OUTPUT OF AN INTERNAL-COMBUSTION ENGINE

FIELD OF THE INVENTION

The invention relates to measuring equipment and more specifically to devices for measuring the power input of an internal-combustion engine.

The present invention can be successfully used in industries that deal with the manufacture and use of internal-combustion engines, for example, in series production of internal-combustion engines, at service stations, repair shops, motor parks, etc.

DESCRIPTION OF THE PRIOR ART

At present there is a trend toward rapid development of automobile and tractor industry. As a consequence, higher demands are imposed on devices used for testing the parameters of the internal-combustion engines, concerning their accuracy, efficiency, reliability and ease of operation.

Known in the art is a device for measuring the power output of an internal-combustion engine (cf. USSR Inventor's Certificate No. 314,088, Cl. G 01 1 23/08) that comprises a serial arrangement of an engine shaft speed pickup, a pulse former, an engine shaft speed selector to which an engine duty control unit is connected, a device control unit to which a clock pulse generator is connected, a unit for determining the difference of two adjacent pulse trains, and a measurement result recording unit. Besides, this device comprises a digital-analog converter connected to the unit for determining the difference of two adjacent pulse trains and a voltage divider connected to the measurement result recording unit.

However, the given device disregards the portions of the periods of the electric pulses the frequency of which is proportional to the speed of rotation of the internal-combustion engine shaft said portions lying within the time intervals (in case the periods are non-multiple) defined by the device control unit. As a result, considerable errors in the determination of the speed of rotation of the engine shaft occur.

Besides, in the given device the time intervals defined by the device control unit cannot be reduced below a certain value since it entails a decrease in accuracy due to the fact that the periods of the electric pulses produced by the pulse former are non-multiple. This leads to a considerable methodical error of the approximation of the curve, representing the transient process of acceleration of the engine, by straight lines. A limited number of measurement readings taken results in even greater error in measuring a dependence of power on the number of revolutions due to approximate interpolation.

The conversion of the measurement results to the required units (for example, horse-power) is effected by a digital-analog converter and a voltage divider the electrical characteristics of which vary both in time and in temperature and this also causes errors in measuring the power output of the internal-combustion engine.

Installation of the engine shaft speed pickup is a rather labour-consuming operation due to changes made in the construction of the engine and this results in low efficiency of the device.

SUMMARY OF THE INVENTION

It is an object of this invention to provide a device for measuring the power output of an internal-combustion engine which permits improving the measurement accuracy.

Another object of this invention is to improve the efficiency of the measurement process.

A further object of this invention is to increase the reliability of measurements.

There is disclosed a device for measuring the power output of an internal-combustion engine comprising a serial arrangement of an engine shaft speed pickup, a pulse former, an engine shaft speed selector to which an engine duty control unit is connected, a device control unit to which a clock pulse generator is connected, a unit for measuring the difference of two adjacent pulse trains and a measurement result recording unit, said device comprises, according to the invention, a unit for producing a preset number of electric pulses, having a first input connected to the clock pulse generator a second input connected to the output of the pulse former output, and having its output connected to an input of the unit for determining the difference of two adjacent pulse trains, and a unit for producing a train of electric pulses the number of which within each train is proportional to the portions of the periods of the pulses generated by the pulse former, these portions lying in the time intervals defined by the device control unit, the pulse train producing unit having a first input connected to the output of the pulse former a second input connected to the output of the device control unit and having its output connected to a second input of the unit for determining the difference of two adjacent pulse trains, and the input of the engine shaft speed selector being connected to the clock pulse generator.

It is advisable that the device for measuring the power output of an internal-combustion engine should further comprise a unit for adding two adjacent pulse trains, having a first input connected to the output of the unit for producing a preset number of electric pulses, a second input connected to the output of the device control unit, a third input connected to the output of the pulse train producing unit, and having its output connected to a first input of the measurement result recording unit whose second input is connected to the device control unit.

It is advisable that in the device for measuring the power output of an internal-combustion engine a system of this engine providing information about the angular position of the engine shaft should be used for picking up the speed of rotation of the shaft of the internal-combustion engine.

Besides it is advisable that in the device for measuring the power output of an internal-combustion engine an alternating-current generator of this engine should be used as a system providing information about the angular position of the engine shaft.

It is advisable that in the device for measuring the power output of an internal-combustion engine an ignition system of this engine should be used as a system providing information about the angular position of the engine shaft.

The present invention makes it possible to measure the portions of periods of the pulses produced by the pulse former, said portions lying within the time intervals defined by the device control unit, which drastically improves the accuracy of measurement of the power output of the internal-combustion engine.

The present invention permits reducing the time intervals defined by the device control unit, which greatly reduces the methodical error of the approximation of the curve, representing the transient process of acceleration of the internal-combustion engine, by straight lines.

The present invention permits greatly increasing the number of measurement readings which also increases the accuracy of the dependence of the power output of the engine on the number of its revolutions.

DESCRIPTION OF THE DRAWINGS

These and other objects and advantages of the present invention will be apparent from the following description taken with the attached drawings in which:

FIG. 7 is a block diagram of the unit for producing a preset number of electric pulses;

FIGS. 9a, b, c, d show timing diagrams of signals present in the device for measuring the power output of an internal-combustion engine;

FIGS. 10a, b, c, d, e, f, g, h, i, j, k, l, m show timing diagrams of signals present in the unit furnishing a train of electric pulses.

DETAILED DESCRIPTION OF THE INVENTION

Let us consider a specific example showing the use of the device of the invention for measuring the power output of an internal-combustion engine adapted to measure the effective power and the dependence of the power output on the number of revolutions of the engine.

Figure 1:
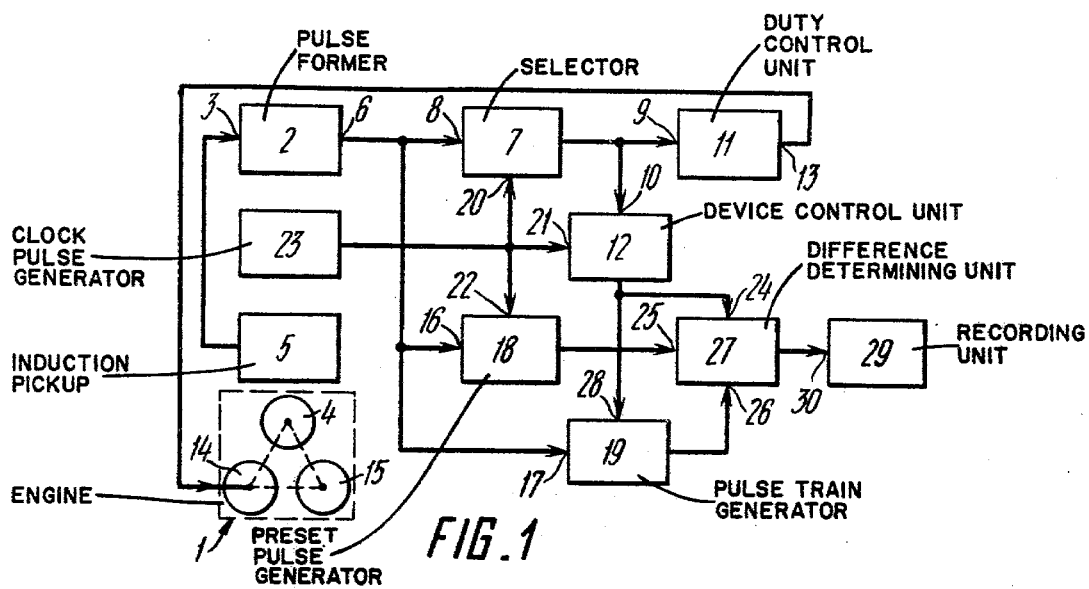
FIG. 1 is a block diagram of a device for measuring the power output of an internal-combustion engine adapted to measure the effective power of the internal-combustion engine where a pulse pickup is used for picking up the speed of rotation of the engine shaft, according to the invention.

In case of measurement of the effective power the device of the invention comprises a pulse former 2 (FIG. 1) whose input 3 connects to a pickup for taking up the speed of rotation of a shaft 4 of an internal-combustion engine 1. Used as a pickup is an induction pickup 5 which is coupled electromagnetically to the engine 1 through the shaft 4. Connected to an output 6 of the pulse former 2 is an input 8 of a selector 7 for selecting the speed of rotation of the shaft 4. Connected to the output of the selector 7 are inputs 9 and 10 of a unit 11 for controlling the duty of the internal-combustion engine 1 and a device control unit 12, respectively. An output 13 of the unit 11 is connected to an ignition system 14 of the engine 1. The shaft 4, the ignition system 14 and an alternating-current generator 15 of the engine 1 are interconnected mechanically. Connected to the output 6 of the pulse former 2 are also inputs 16 and 17 respectively of a unit 18 for producing a preset number of electric pulses and of a unit 19 for producing a train of electric pulses, the number of which within each train is proportional to the portions of the periods of the pulses generated by the pulse former 2, said portions lying within the time intervals defined by the device control unit 12. Connected to inputs 20, 21 and 22 of the selector 7, unit 12 and unit 18, respectively, is a clock pulse generator 23. Connected to the outputs of the units 12, 18 and 19 are inputs 24, 25, and 26, respectively, of a unit 27 for determining the difference of two adjacent pulse trains. An input 28 of the unit 19 is coupled to the output of the unit 12. An input 30 of a measurement result recording unit 29 is connected to the output of the unit 27.

Figure 2:
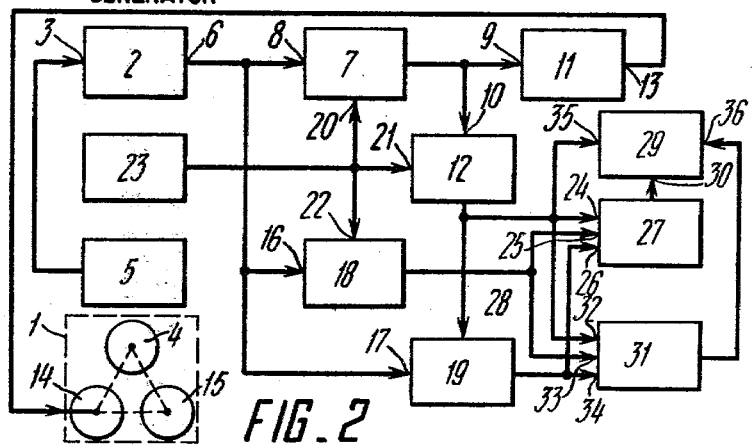
FIG. 2 is a block diagram of a device for measuring the power output of an internal-combustion engine adapted to measure the dependence of the power output of the internal-combustion engine on the number of its revolutions where a pulse pickup is used for picking up the speed of rotation of the engine shaft, according to the present invention.

In case of measuring the dependence of the power output of the internal-combustion engine 1 (FIG. 2) on the number of its revolutions the device of the invention further comprises a unit 31 for adding two adjacent pulse trains, having its inputs 32, 33 and 34 connected respectively to the outputs of the units 12, 18 and 19. Two inputs 35 and 36 of the unit 29 are connected to the outputs of the units 12 and 31.

Figure 3:
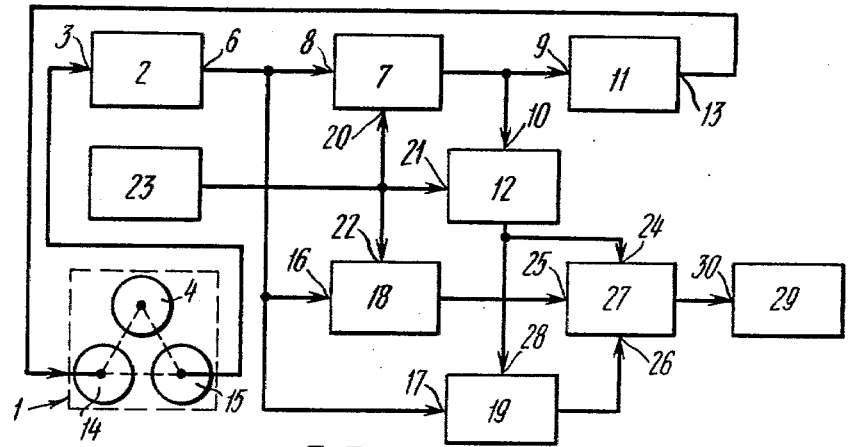
FIG. 3 is a block diagram of a device for measuring the power output of an internal-combustion engine adapted to measure the effective power of the internal-combustion engine where an alternating-current generator of the engine is used for picking up the speed of rotation of the engine shaft, according to the invention.
Figure 4:
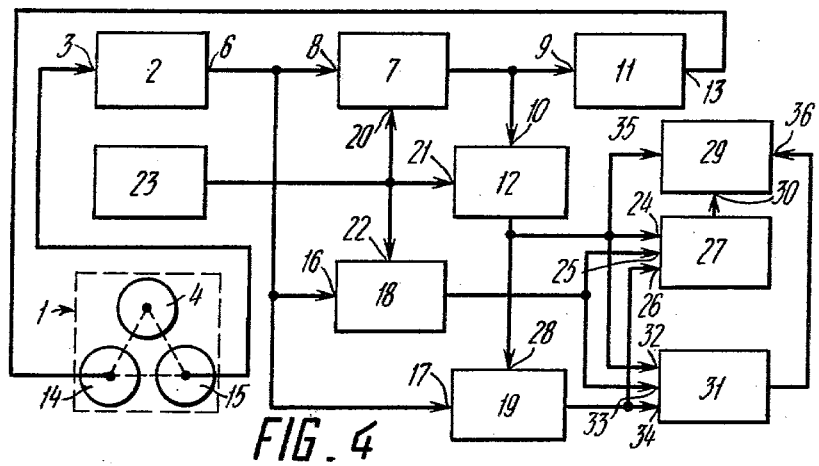
FIG. 4 is a block diagram of a device for measuring the power output of an internal-combustion engine adapted to measure the dependence of the power output of the internal-combustion engine on the number of its revolutions, where an alternating-current generator of the engine is used for picking up the speed of rotation of the engine shaft according to the invention.

According to an embodiment of the device of the invention (FIGS. 3 and 4), a system of the engine 1 providing information about the angular position of the shaft 4, i.e., the alternating-current generator 15 of engine 1, is used for picking up the speed of rotation of the shaft 4 and the input 3 of the pulse former 2 is connected directly to the output of the generator 15.

Figure 5:
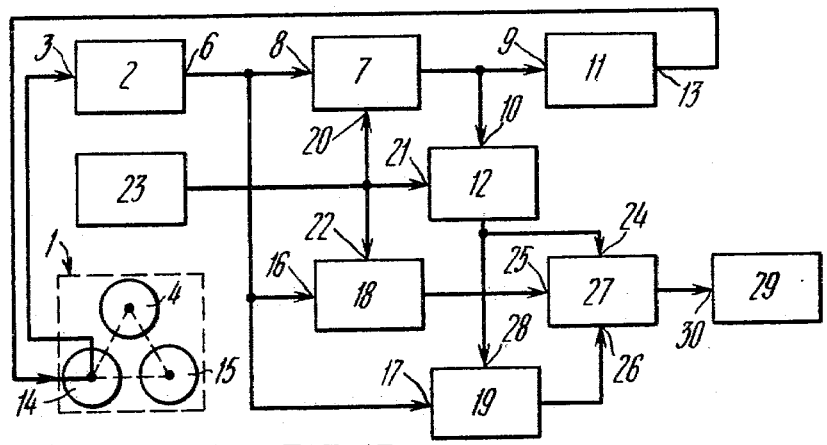
FIG. 5 is a block diagram of a device for measuring the power output of an internal-combustion engine adapted to measure the effective power of the internal-combustion engine where an ignition system of this engine is used for picking up the speed of rotation of the engine shaft, according to the invention.
Figure 6:
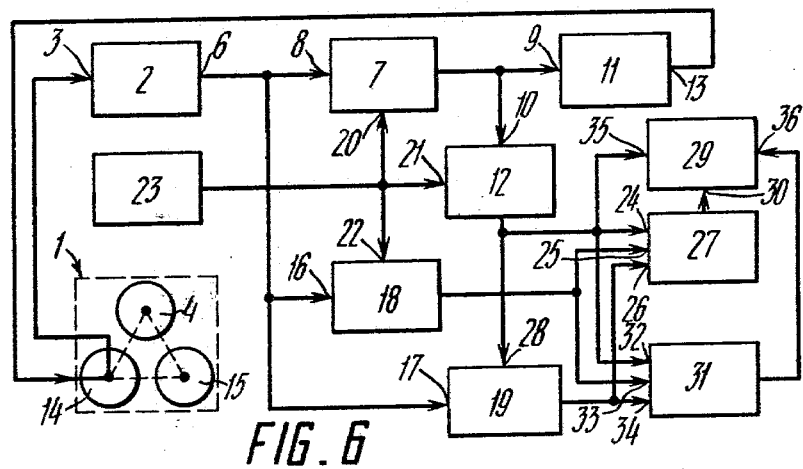
FIG. 6 is a block diagram of a device for measuring the power output of an internal-combustion engine adapted to measure the dependence of the power output of the internal-combustion engine on the number of its revolutions where an ignition system of the engine is used for picking up the speed of rotation of the engine shaft, according to the in accordance invention.

According to another embodiment of the device of the invention (FIGS. 5 and 6) a system of the engine 1 providing information about the angular position of the shaft 4, i.e., the ignition system 14, is used for picking up the speed of rotation of the shaft and the input 3 of the pulse former 2 is connected directly to the output of the ignition system 14.

The unit 18 (FIGS. 1, 2, 3, 4, 5, 6) for producing a preset number of electric pulses comprises several series-connected elements as follows: a flip-flop 37 (FIG. 7) whose input 38 connects to an OR circuit 39; an AND circuit 40 whose output 41 is actually the output of the unit 18 (FIGS. 1, 2, 3, 4, 5, 6), a counter 42 (FIG. 7) whose input 43 connects to the OR circuit 39; and a decoder 44 connected to an input 45 of the OR circuit 39 whose input 46 is connected to a reset button 47.

Figure 8:
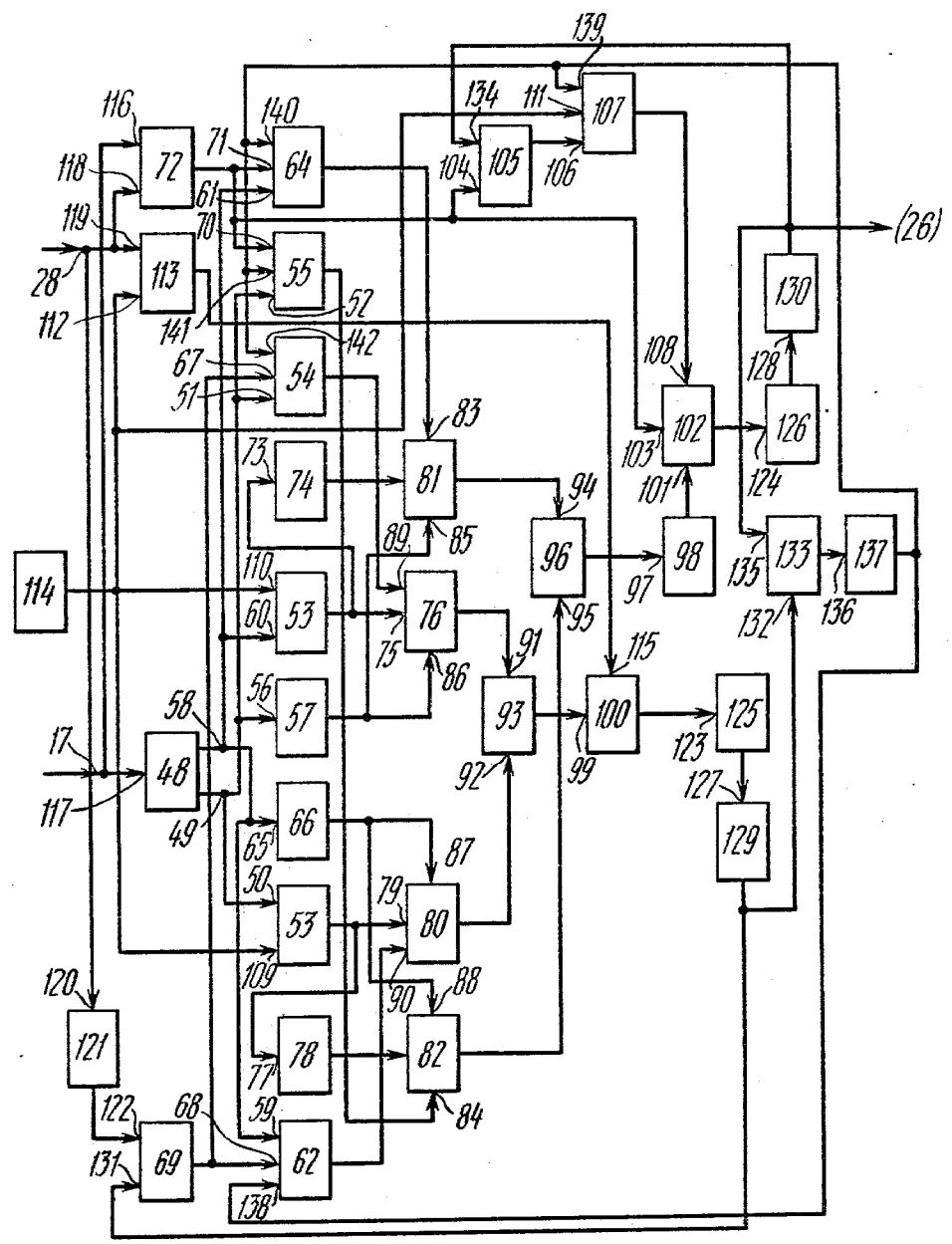
FIG. 8 is a block diagram of the unit for producing a train of electric pulses the number of which within each train is proportional to the portions of the periods of the pulses generated by the pulse formed, said portions lying within the time intervals defined by the device control unit.

The unit 19 (FIGS. 1, 2, 3, 4, 5, 6) for producing a train of electric pulses comprises a flip-flop 48 (FIG. 8) having an output 49 connected to inputs 50, 51, 51 of AND circuits 53, 54, 55, respectively, and to an input 56 of a pulse former 57 and having an output 58 connected to inputs 59, 60, 61 of AND circuits 62, 63, 64, respectively, and to an input 65 of a pulse former 66. Connected to inputs 67 and 58 of the AND circuits 54 and 62, respectively, is an OR circuit 69. Connected to inputs 70 and 71 of the AND circuits 55 and 64, respectively, is an AND circuit 72. The output of the AND circuit 63 is connected to an input 73 of a frequency divider 74 and to an input 75 of a counter 76, and the output of the AND circuit 53 is connected to an input 77 of a frequency divider 78 and to an input 79 of a counter 80. The frequency dividers 74 and 78 are connected respectively to counters 81 and 82. Inputs 83 and 84 of the counters 81 and 82, respectively, are connected to respective AND circuits 64 and 55. Inputs 85 and 86 of the counters 81 and 76, respectively, are connected to the output of the pulse former 57, and inputs 87 and 88 of the counters 80 and 82, respectively, are connected to the output of the pulse former 66. Inputs 89 and 90 of the counters 76 and 80, respectively, are connected to the outputs of respective AND circuits 54 and 62. Connected to the outputs of the counters 76 and 80 are respectively inputs 91 and 92 of an OR circuit 93, and connected to the outputs of the counters 81 and 82 are respectively inputs 94 and 95 of an OR circuit 96. Connected to the output of the OR circuit 96 is an input 97 of an adder 98. Connected to the output of the OR circuit 93 is an output 99 of a bidirectional counter 100 and connected to the output of the adder 98 is an output 101 of a bidirectional counter 102. An input 103 of the counter 102 and an input 104 of a flip-flop 105 are connected to the output of the AND circuit 72. Connected to the output of the flip-flop 105 is an input 106 of an AND circuit 107 whose output is connected to an input 108 of the counter 102. A clock pulse generator 114 is coupled to inputs 109, 110, 111 of the AND circuits 53, 63 and 107, respectively, and to an input 112 of an AND circuit 113. An input 115 of the counter 100 is connected to the output of the AND circuit 113. Inputs 116 and 117 of the AND circuit 72 and flip-flop 48, respectively, are joined together and serve as the input 17 of the unit 19 (FIGS. 1, 2, 3, 4, 5, 6). Inputs 118 and 119 (FIG. 8) of the AND circuits 72 and 113, respectively, and an input 120 of a pulse former 121 are joined together and serve as the input 28 of the unit 19 (FIGS. 1, 2, 3, 4, 5, 6). An input 122 of the OR circuit 69 is connected to the output of the pulse former 121 (FIG. 8). Connected to the outputs of the bidirectional counters 100 and 102 are inputs 123 and 124 of respective decoders 125 and 126. The outputs of the decoders 125 and 126 are connected to inputs 127 and 128 of the respective pulse formers 129 and 130. The output of the pulse former 129 is connected to an input 131 of the OR circuit 69 and to an input 132 of an AND circuit 133, and the output of the pulse former 130 is connected to an input 134 of the flip-flop 105 and to an input 135 of the AND circuit 133. The output of the AND circuit 133 is connected to an input 136 of a flip-flop 137. Connected to the output of a flip-flop 137 are inputs 138, 139, 140, 141, 142 of the AND circuits 62, 107, 64, 55, 54.

The device of the invention operates as follows.

The induction-type pickup 5 for picking up the speed of rotation of the shaft 4 of the internal-combustion engine 1 generates signals the frequency of which is proportional to the speed of rotation of the shaft 4. According to these signals coming to the input 3 of the pulse former 2 the latter forms pulses 143 (shown in FIG. 9a) that have a certain amplitude and duration. These pulses 143 are fed to the input 8 (FIG. 1) of the selector 7 for selecting the speed of the shaft 4, and to the input 16 of the unit 18 for producing a preset number of electric pulses, the inputs 20 and 22 of which accept the pulses from the clock pulse generator 23.

At the moment the shaft 4 attains, when accelerating, a preset speed, the selector 7 furnishes a signal to the input 10 of the device control unit 12 the input 21 of which accepts the pulses coming from the clock pulse generator 23. In this case, the unit 12 forms pulse trains 144 (shown in FIG. 9a) of a definite time interval (duration) $\Delta \tau$ (shown in FIG. 9a). These pulse trains 144 are applied to the input 24 (FIG. 1) of the unit 27 for determining the difference of two adjacent pulse trains and also to the input 28 of the unit 19 for producing a pulse train.

The unit 19 determines time intervals each of them being proportional to portions $\Delta t_1$, $\Delta t_2$, $\Delta t_3$, $\Delta t_4$, $\Delta t_5$, $\Delta t_6$ (shown in FIG. 9c) of the periods of the pulses 143 from the pulse former 2, said portions lying within time intervals $\Delta \tau$ (FIG. 9b) and furnishes trains 145 (shown in FIG. 9d) of pulses the number $n_1$, $n_2$, $n_3$, $n_4$, $n_5$ or $n_6$ of the pulses (shown in FIG. 9d) in each train 145 being proportional to portion $\Delta t_1$, $\Delta t_2$, $\Delta t_3$, $\Delta t_4$, $\Delta t_5$ or $\Delta t_6$ (FIG. 9e) both at the beginning and at the end of the time interval $\Delta \tau$ (FIG. 9b).

When measuring portions $\Delta t_1$, $\Delta t_2$, $\Delta t_3$, $\Delta t_4$, $\Delta t_5$, $\Delta t_6$ (FIG. 9c), the division factor is varied, depending on the required accuracy, and makes up a certain portion of the period of the pulses 143 (FIG. 9a) coming from the pulse former 2 (FIG. 1) (for example, 0.1) irrespective of the number of revolutions of the engine 1.

In the unit 18 for producing a preset number of electric pulses the number of the pulses 143 (FIG. 9a) from the former 2 (FIG. 1) which appear within time interval $\Delta \tau$ (FIG. 9b) is multiplied by an inverse value of the division factor for measuring portions $\Delta t_1$, $\Delta t_2$, $\Delta t_3$, $\Delta t_4$, $\Delta t_5$, $\Delta t_6$ (FIG. 9c) of the periods of the pulses i.e., in the given case by ten, and the produced pulses are applied to the unit 27 for determining the difference of two adjacent pulse trains.

The unit 27 performs the subtraction of two pulse trains the number of pulses in which is proportional to the whole periods of the pulses 143 and to portions $\Delta t_1$, $\Delta t_2$, $\Delta t_3$, $\Delta t_4$, $\Delta t_5$, $\Delta t_6$ (FIG. 9c) of these periods lying in the first and second time intervals $\Delta \tau$ (FIG. 9c). This difference which determines the power output of the engine 1 (FIG. 1) is fed to the measurement result recording unit 29.

In case of variation of portions $\Delta t_1$, $\Delta t_2$, $\Delta t_3$, $\Delta t_4$, $\Delta t_5$, $\Delta t_6$ (FIG. 9c) of the periods of the pulses 143, the division factor and time interval $\Delta \tau$ (FIG. 9b) are selected so as to take into account the required accuracy of measurements and the known acceleration-versus-power factor in order to obtain the power measurement result, for example, in terms of horse-power.

The unit 11 (FIGS. 1, 3, 5) for controlling the duty of the engine 1 is operated by a signal coming from the output of the selector 7 to its input 9 when a certain number of revolutions is attained and brings the engine 1 to the required duty by influencing the ignition system 14.

In case of measurement of the dependence of the power output of the internal-combustion engine 1 on the number of its revolutions the device of the invention further comprises the unit 31 (FIGS. 2, 4, 6) for adding two adjacent pulse trains. In this case the inputs 32, 33, 34 accept the signals coming from units 12, 18, 19, respectively.

The operation of the device of the invention in this mode is similar to that for measuring the effective power with the only difference that the unit 27 performs subtraction of two adjacent pulse trains the number of pulses in which is proportional to the periods of the pulses 143 produced by the pulse former 2 with due account for portions $\Delta t_1$, $\Delta t_2$, $\Delta t_3$, $\Delta t_4$, $\Delta t_5$, $\Delta t_6$ (FIG. 9c) contained in time interval $\Delta \tau$ (FIG. 9b) while the unit 31 (FIGS. 2, 4, 6) performs addition of the same pulse trains.

The obtained difference from the unit 27, proportional to the power output of the engine 1, and the result of addition from the unit 31, proportional to the mean speed of rotation of the shaft 4 for the time of measurement, are applied further to the unit 29 that is controlled by a signal coming to its input 24 from the unit 12 controlling the device.

The unit 18 (FIGS. 1, 2, 3, 4, 5, 6) for producing a preset number of electric pulses operates as follows.

The reset button 47 (FIG. 7) sets the flip-flop 37 and the counter 42 to the initial states by applying a signal to the input 38 and the input 43, respectively, via the OR circuit 39. As this occurs, the flip-flop 37 applies a disable potential to the AND circuit 40. When the pulse 143 (FIG. 9a) comes from the pulse former 2 (FIGS. 1, 2, 3, 4, 5, 6) to the input 16, the flip-flop 37 (FIG. 7) changes its state and the pulses from the clock pulse generator 23 (FIGS. 1, 2, 3, 4, 5, 6), coming to the input 22 of the AND circuit 40 (FIG. 7), pass through this circuit and are fed from the output 41 to the counter 42. At the same time, these pulses are applied from the output 41 which is also the output of the unit 18 (FIGS. 1, 2, 3, 4, 5, 6) to the input 25 of the unit 27.

When the counter 42 (FIG. 7) accumulates a preset number of pulses, for example ten, the decoder 44 operates and sets the flip-flop 37 via the OR circuit 39 again to the initial state so that the pulses from the input 22 of the clock pulse generator 23 (FIGS. 1, 2, 3, 4, 5, 6) do not pass through the AND circuit 40 (FIG. 7) to the counter 42. On arrival of the next pulse 143 (FIG. 9a) from the pulse former 2 (FIGS. 1, 2, 3, 4, 5, 6) the unit 18 operates in the same manner.

By this means the unit 18 produces instead of a single pulse of the former 2 such number of pulses which is determined by the state of the decocer 44 (FIG. 7) and in the given case it produces ten pulses available from the clock pulse generator 23.

The unit 19 for producing a train of electric pulses operates as follows.

The pulses 143 (shown in FIG. 10a) having periods $T_1$, $T_2$, $T_3$, $T_4$, $T_5$, $T_6$ (shown in FIG. 10a) are fed from the output 6 (FIGS. 1, 2, 3, 4, 5, 6) of the former 2 to the input 117 (FIG. 8) of the flip-flop 48. On arrival of each pulse 143 (FIG. 10a) the flip-flop 48 changes its state. Applied from the outputs 49, 58 of the flip-flop 48 are signals in the form of a pulse train 146 (shown in FIG. 10b) and in the form of a pulse train 147 (shown in FIG. 10c) to the input 50 (FIG. 8) of the AND circuit 53 and to the input 60 of the AND circuit 63. The inputs 109 and 110 of the AND circuits 53 and 63, respectively, accept the pulses coming from the clock pulse generator 114. By this means pulse trains 148 (shown in FIG. 10d) of the clock pulse generator 114 are fed during periods $T_1$, $T_3$, $T_5$, $T_7$ (FIG. 10a) and pulse trains 149 (shown in FIG. 10e) of the clock pulse generator 114 (FIG. 8) during periods $T_2$, $T_4$, $T_6$ through the AND circuits 63 and 53 (FIG. 8) to the inputs 75 and 79, respectively, of the counters 76 and 80 and through the frequency dividers 74 and 78, to the counters 81 and 82. The counters 76, 81 and 80, 82 are cleared by the signals in the form of pulse trains 150 and 151 (shown respectively in FIGS. 10f and 10g), coming from the outputs of the pulse formers 57 and 66 (FIG. 8), in such a manner the clearing takes place only at the end of the next period.

According to a signal in the form of a pulse train 152 (shown in FIG. 10h) of time interval $\Delta t$ (shown in FIG. 10h) coming from the unit 12 (FIGS. 1, 2, 3, 4, 5, 6) the pulse former 121 (FIG. 8) forms a pulse 153 (shown in FIG. 10i) at the end of time interval $\Delta t$ (FIG. 10h) that is applied through the OR circuit 69 (FIG. 8) to the input 67 of the AND circuit 54 and to the input 68 of the AND circuit 62. The inputs 51 and 59 of the AND circuits 54 and 62, respectively, accept the pulses 146 (FIG. 10b) and pulses 147 (FIG. 10c) coming from the outputs 58 and 49 (FIG. 8) of the flip-flop 48. At the moment of coincidence of the pulses 153 (FIG. 10i) with the pulses 146 (FIG. 10b) or with the pulses 147 (FIG. 10c) the AND circuit 54 (FIG. 8) or the AND circuit 62 operates to place the contents of one of the counters 76, 80 (for example, counter 80) into the counter 100 via the OR circuit 93. On the other side, in the presence of an enable signal in the form of a pulse train 154 (shown in FIG. 10j) the unit 12 (FIGS. 1, 2, 3, 4, 5, 6) gives clearance for the passage of the signals of the clock pulse generator 114 (FIG. 8) through the AND circuit 113 to the input 115 of the counter 100.

At the moment the counter 100 is in the zero state the pulse former 129, on receiving a signal from the decoder 125, forms a pulse which is operated to place the contents of the counter 76, through the OR circuit 69 and through the AND circuit 54, into the counter 100 and then the subtraction process will take place in the counter 100 until zero is reached. By this means pulses 155 (shown in FIG. 10k) appear at the output of the pulse former 129. The periods $T_2$, $T_3$, $T_4$ (shown in FIG. 10k) of the pulses 155 are equal to the periods $T_2$, $T_3$, $T_4$ (FIG. 10a) of the pulses 143 (FIG. 10a) of the pulse former 2 (FIGS. 1, 2, 3, 4, 5, 6) and the beginning of the period $T_2$ (FIG. 10k) coincides with the end of interval $\Delta t$ (FIG. 10h). Then these pulses 155 (FIG. 10k) are fed to the input 132 (FIG. 8) of the AND circuit 133.

The circuit 72, according to the signals coming to its inputs 116 and 118, produces a pulse train 156 (shown in FIG. 10l). At the moment of coincidence with the signals coming from the outputs 49, 58 (FIG. 8) of the flip-flop 48 via the AND circuits 55 or 64, these pulses 156 (FIG. 10l) are used to place the contents of the flip-flops 81, 82 (for example, the flip-flop 81) into the adder 98 through the OR circuit 96.

The state of the counters 81 and 82 is brought into coincidence with the state of the counters 76 and 80 using a respective division factor set in the counters 74 and 78, for example, 0.1. Simultaneously with placing the contents of the counters 81 and 82 into the adder 98 the contents of the adder 98 proper is carried into the bidirectional counter 102. After that the pulses of the clock pulse generator 114 are applied through the AND circuit 107 to the input 108 of the counter 102. At the moment the contents of the counter 102 equals zero, the decoder 126 operates to trigger the pulse former 130 which sets the flip-flip 105 to a state at which the pulses of the clock pulse generator 114 do not pass to the counter 102. On arrival of the next signal to the input 116 the contents of the counter 82 is placed into the adder 98 and as to the rest the process does not differ from the above described process.

By this means, pulses 157 (shown in FIG. 10m) are formed at the output of the pulse former 130. These pulses are shifted relative to the pulses 143 (FIG. 10a) of the pulse former 2 (FIGS. 1, 2, 3, 4, 5, 6) by 0.1 $T_2$, 0.1 $(T_2+T_3)$, 0.1 $(T_1+T_2+T_3)$ (FIG. 10m) and so on.

At the moment of coincidence of the pulses from the pulse formers 129 and 130 (FIG. 8) the AND circuit 133 triggers the flip-flop 137 which gives an inhibition command to the AND circuits 62, 107, 64, 55, 54, and the measurement process goes to its end. In this case, the number of the pulses 157 (FIG. 10m) that appear at the output of the pulse former 130 (FIG. 8) is proportional to portion $\Delta T$ (shown in FIG. 10m) of a period with the given division factor. These pulses 157 (FIG. 10m) are then applied to the input 26 of the unit 27 (FIGS. 1, 2, 3, 4, 5, 6).

In accordance with the invention, the use of the device for measuring the power output of an internal-combustion engine is most advantageous in case when a system of the engine 1 providing information about the angular position of the shaft 4 of the engine 1 is used for picking up the speed of rotation of the shaft 4.

As shown in FIGS. 3, 4, 5, 6, the alternating-current generator 15 (FIGS. 3, 4) and the ignition system 14 (FIGS. 5, 6) of the engine 1 are used as a system providing information about the angular position of the shaft 4 of this engine 1.

In these cases, the operation of the device of the invention takes place as described above.

The present invention possesses a certain economical effectiveness since the proposed device may be operated by low qualified personnel.

Besides, the device of the invention has small size and weight which makes it possible to use it effectively for measurement of the power output of an inernal-combustion engine.

What is claimed is:

1. A device for measuring the power output of an internal-combustion engine, having an alternating-current generator with an output, an ignition system having an input and an output and coupled mechanically with said alternating-current generator, a shaft mechanically coupled with said alternating-current generator, and an ignition system which device comprises:
   a pickup for taking up the speed of rotation of the shaft of said internal-combustion engine, having an output;
   a pulse former having an input and an output, said input being connected to said output of said pickup taking up the speed of rotation of said shaft of said internal-combustion engine;
   a selector for selecting the speed of said shaft of said internal-combustion engine, having a first input, a second input, and an output, said first input being coupled to said output of said pulse former;
   a unit for controlling the duty of said internal-combustion engine having an input and an output, said input being coupled to said output of said selector, and said output being coupled to the input of said ingnition system;
   a unit for controlling said device, having a first input, a second input, and an output, said first input being coupled to said output of the selector;
   a unit for producing a preset number of electric pulses, having a first input, a second input, and an output, said first input being coupled to said output of said pulse former;
   a clock pulse generator having an output connected to said second input of said selector, to said second input of said device control unit and to said second input of said unit for producing a preset number of electric pulses;
   a unit for producing a train of electric pulses the number of which within each said train being proportional to the portions of the periods of the pulses generated by said pulse former, said portions lying within the time intervals defined by said device control unit, having a first input, a second input and an output, said first input being coupled to said output of said pulse former, and said second input being coupled to said output of said device control unit;
   a unit for determining the difference of two adjacent pulse trains, having a first input, a second input, a third input and an output, said first input being coupled to said output of said device control unit, said second input being coupled to said output of said unit for producing a preset number of electric pulses and said third input being coupled to said output of said unit producing a train of electric pulses;
   a measurement result recording unit having a first input, said first input being coupled to said output of said unit for determining the difference of two adjacent pulse trains.

2. A device according to claim 1, comprising:
   said measurement result recording unit having a second input and a third input, said second input being coupled to said output of said device control unit;
   a unit for adding two adjacent pulse trains having a first input, a second input, a third input and an output, said first input being coupled to said output of said device control unit, said second input being coupled to said output of said unit for producing a preset number of electric pulses, said third input being coupled to said output of said unit for producing a train of electric pulses, and said output being coupled to said output of said measurement result recording unit.

3. A device according to claim 2 wherein a system of said internal-combustion engine, providing information about the angular position of said shaft of said internal-combustion engine, is used as said pickup for taking up the speed of rotation of said shaft of said internal-combustion engine.

4. A device according to claim 3 wherein said ignition system of said internal-combustion engine having its output coupled to said input of said pulse former is used as said system of said internal-combustion engine.

5. A device according to claim 3 wherein said alternating-current generator of said internal-combustion engine having its output coupled to said input of said pulse former is used as said system of said internal-combustion engine.

6. A device according to claim 3 wherein said ignition system of said internal-combustion engine, having output coupled to said input of said pulse former is used as said system of said internal-combustion engine.

7. A device according to claim 1 wherein a system of said internal-combustion engine, providing information about the angular position of said shaft of said internal-combustion engine, is used as said pickup for taking up the speed of said shaft of said internal-combustion engine.

8. A device according to claim 7 wherein said alternating-current generator of said internal combustion engine having its output coupled to said input of said pulse former is used as said system of said internal-combustion engine.

* * * * *